2,372,201

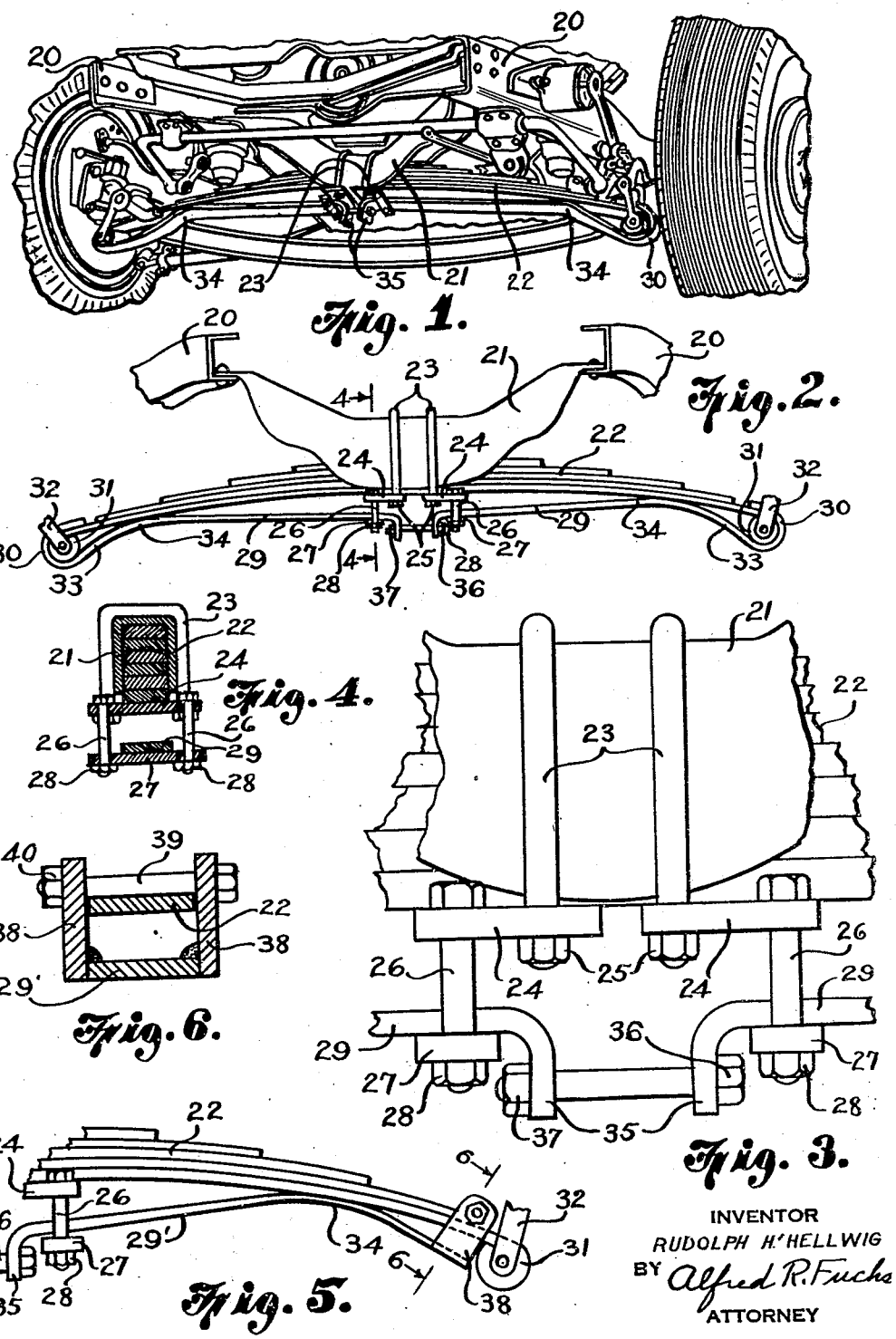

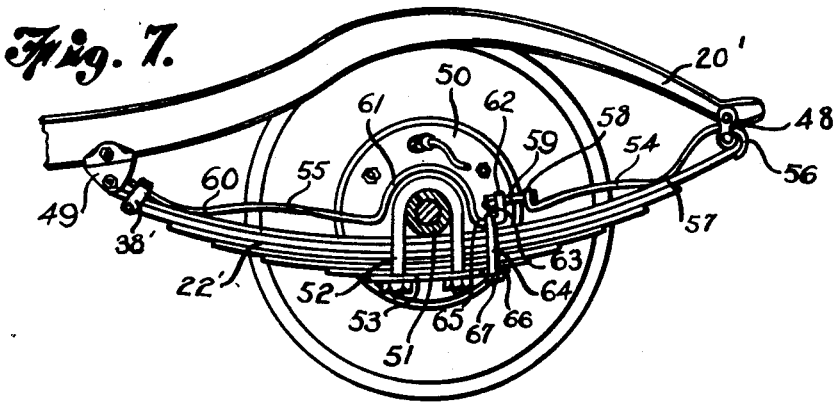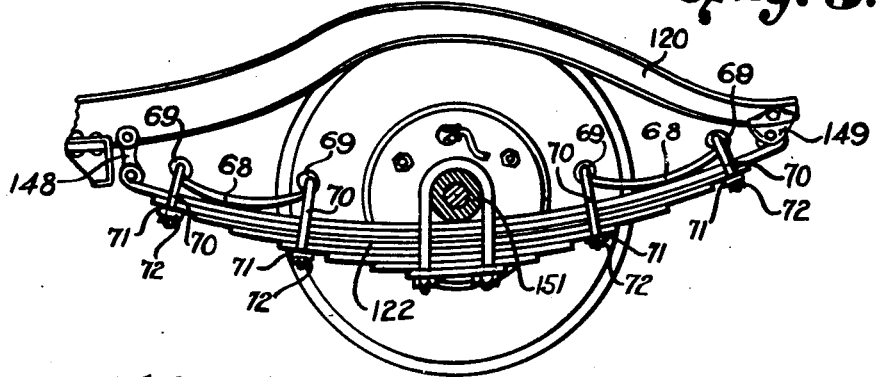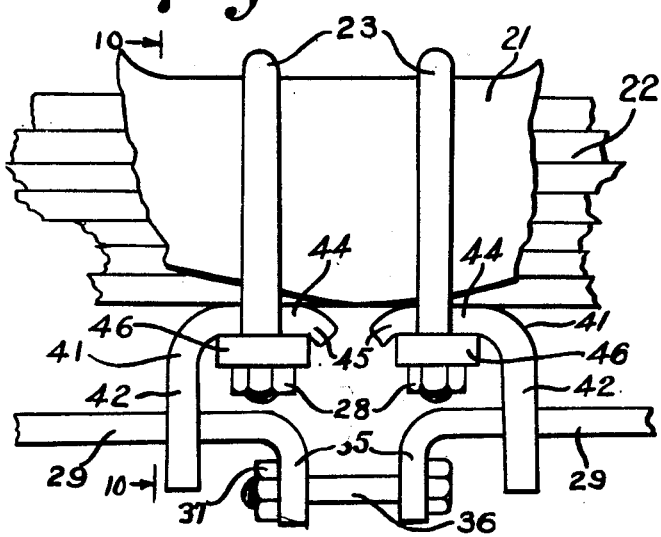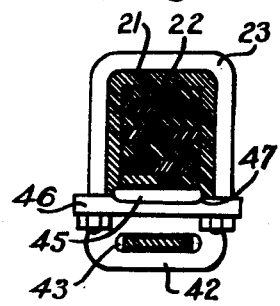
INVENTOR
RUDOLPH H. HELLWIG
BY Alfred R. Fuchs
ATTORNEY Patented Mar. 27, 1945

UNITED STATES PATENT OFFICE 2,372,201

OVERLOAD SPRING

Rudolph H. Hellwig, Kansas City, Kans.

Application April 30, 1942, Serial No. 441,155

14 Claims. (Cl. 267—45)

My invention relates to springs, and more particularly to overload springs for automobiles.

When an automobile is designed, the parts of the steering mechanism are made to operate most efficiently with a certain distance between the frame and axle, which is determined by the front springs, or spring. Whether such springs are leaf springs, or coil springs, or a single spring, these springs are made with a certain curvature and strength to carry the frame of the automobile at the correct height. In the case of leaf springs, the springs are arched properly for this purpose. After the automobile has been in service for a relatively short period of time the springs begin to lose their arch, that is, they become flatter. After the springs begin to sag, the axle and the steering device get out of proper position and out of the alignment that the same had originally, and the further the springs sag, the further out of normal position the frame will be relative to the axle, or axles, and the harder it will become to control the automobile. This not only affects the driving of the automobile, but causes considerable excess wear on the tires, due to the fact that it tends to throw the wheels out of proper alignment.

When an automobile gets in this condition it is then necessary to either have a new spring installed, or to have the springs re-arched, to put the axle alignment back to its normal position.

It is a purpose of my invention to correct the sagging of leaf springs in automobiles, whether a front spring, or springs, or rear spring, or springs, and particularly a front transverse leaf spring, such as used in the Ford automobile, without the necessity of re-arching the springs or replacing the same. This is accomplished by an auxiliary spring, of which certain types are disclosed in my application, which cooperate with the spring, or springs, of the automobile in a unique manner to overcome the sagging thereof.

It is a purpose of my invention to provide an auxiliary spring of the above mentioned character, which is simple in construction and simple and easy to install and which requires no changes to be made in the regular spring on the automobile.

It is a further purpose of my invention to provide an auxiliary spring of the above mentioned character, the action of which in taking care of any overload or in overcoming the sag in weakened springs is adjustable and which is so designed as to furnish the needed strength at the weakest point in the regular spring.

It is a further purpose of my invention to provide means comprising auxiliary springs for raising the frame of the automobile to the proper height relative to the axle or axles.

Among other advantages of my invention, my auxiliary spring avoids sway of an automobile at high speed, and makes the steering of the same much freer and easier because the "caster" and "camber" can be properly set, and furthermore my invention helps to stop spring breakage because it protects the spring at the weakest point and acts as a stabilizer for automobiles in which the frame and weight is carried at a center point of a transverse leaf spring.

Other objects and advantages of my invention will appear as the description of the drawings proceeds. I desire to have it understood, however, that I do not intend to limit myself to the particular details shown or described, except as defined in the claims.

In the drawings:

Fig. 1 is a fragmentary perspective view looking upwardly at an oblique angle to the front transverse spring of an automobile embodying my invention.

Fig. 2 is an elevational view of a leaf spring on an automobile, showing my invention applied thereto, fragmentary portions of the frame and shackles being shown.

Fig. 3 is an enlarged fragmentary elevational view of the spring securing means at the center of the vehicle spring.

Fig. 4 is a section taken substantially on the line 4—4 of Fig. 2.

Fig. 5 is a fragmentary elevational view of a modified form of my invention.

Fig. 6 is a section taken on the line 6—6 of Fig. 5.

Fig. 7 is a view in elevation, showing my invention applied to a longitudinally extending leaf spring on an automobile, a portion of the frame and other parts associated therewith being shown.

Fig. 8 is a view similar to Fig. 7 of a further modification.

Fig. 9 is a view similar to Fig. 3 of a modified form of mounting for the adjacent ends of the auxiliary springs, and Fig. 10 is a section taken on the line 10—10 of Fig. 9, but on a somewhat reduced scale.

Referring in detail to the drawings, in Fig. 1 is shown an automobile having longitudinal frame members 20, between which extends a transverse frame member 21, to which is secured an arched transversely extending leaf spring 22, made up of a multiplicity of leaves, the exact number of leaves ordinarily used not being shown because the exact number of leaves is of no importance to the invention, and the closeness of the lines necessary to show the total number of leaves would be confusing in the drawings. The leaves of the spring increase in number toward the center of the same and all of the leaves are secured together and to the frame member 21 by means of securing devices comprising the U-bolts 23 and transverse bars or plate-like members. The plate-like members ordinarily used for securing the leaf spring 22 to the frame member 21 are replaced by plate-like members 24, in carrying out my invention, which are provided with pairs of openings for receiving the U-bolts 23 and are clamped to the leaf spring 22 by means of the nuts 25 cooperating with the U-bolts 23.

In the form of spring shown, the frame member 21 serves as a keeper due to its channeled character, for holding the leaves in proper relationship to each other. Thus the plates 24 clamp the super-imposed leaves of the springs 22 in position in the center of the channel member. Said plates 24 are further provided with openings through which the bolts 26 extend, said bolts also extending through openings in the bar-like members 27, which may be the members that would ordinarily have been provided for securing the springs 22 to the channel member 21, nuts 28 screw-threadedly engaging with the bolts 26, securing the plate-like members 27 in position.

My invention embodies auxiliary springs 29, there being a pair of such springs provided for each set of leaf springs 22, said springs 29 having hook-like end portions 30 thereon that extend around the eyes 31 provided on the outer ends of the leaf springs 22 for connection of the spring shackles 32 therewith. The springs 29 are curved so as to incline from the vehicle springs 22 from the hook portions 30 thereon, the inclined portions 33 extending gradually toward the lower leaf of the spring 22, and said springs 29 having a curved portion 34, the convex side of which engages the bottommost leaf of the vehicle spring 22, preferably, at the weakest point, or point of greatest flexure thereof, which is spaced from the point of securement to the frame member 21 and also from the eyes 31, but ordinarily is nearer the eyes than the center of the spring 22.

Each spring 29 is also provided with a portion that inclines gradually away from the vehicle spring 22 and which is engaged by a bar, or plate-like member, 27 for securing the same in predetermined spaced relation to the spring 22. Each of said auxiliary spring members 29 further terminates in a depending ear 35, which is provided with an opening through which a headed screw-threaded member, or bolt-like member, 36 extends, with which a nut 37 cooperates. The springs 29 are normally arched to a considerably greater extent than shown in Figs. 2 and 3 of the drawings before being applied to the vehicle. Said springs are applied by engaging the hook portions 30 around the eyes 31 on the ends of the spring 22. The bolt-like member 36 is passed through the perforations or eyes in the ears 35 and the nut 37 applied to the bolt 36 to hold said spring-like members 29 in assembled relation to each other. The bolts 26 and the bar-like members 27 are then applied to hold the springs 29 in alignment with the spring 22, after which the nut 37 is tightened up until the desired arch is restored to the spring 22, this being obtained by the pressure exerted by the convex portion 34 of each spring 29 on the leaf spring 22 at the point of greatest flexure thereof.

The force exerted by each bowed portion 34 of each spring 29 is dependent upon the tension existing longitudinally of each member 29, due to the fact that each spring 29 is anchored to the spring 22 at each end thereof, and the overall length of the two springs 29 is determined by the curvature thereof and the adjustment of the bolt-like member 36. Thus by adjusting the nut 37 on the bolt-like member 36 the hook-like members 30 and the eyes 31 of the springs are drawn toward each other and the arch in the leaf spring 22 is restored, the convexly curved portion of each spring 29 at the curve 34 therein pressing upwardly on the leaf spring at the points thereof where the greatest flexure would ordinarily take place.

It will be obvious that the exact arch of the spring 22 desired can be obtained by adjustment of the bolt-like member 36, and thus the position of the frame members 20 relative to the axles of the vehicle can be exactly determined and can be made such as to conform to the original relative position of these parts when the spring 22 was originally put in position in the vehicle.

While for ease of assembly the hook-like members 30 are, preferably, provided for securing the outer ends of the springs 29 to the vehicle springs, under certain conditions it is impossible to use said hook-like members 30, because there is not sufficient room between the eyes 31 on the vehicle springs and other portions of the vehicle adjacent thereto. Under such circumstances the means for securing the outer ends of the springs shown in Figs. 5 and 6 is provided. Instead of securing the outer ends of said springs to the eyes 31, the outer ends of said springs are secured to the spring 22 near said eyes, by providing stirrup-like bracket members having the side plates, or bars 38, which are welded to the springs 29' at the outer ends thereof, as will be clear from Figs. 5 and 6. Said side plates or bars are connected together by means of a bolt-like member 39 and nut 40, which bolt-like member 39 engages over the top side of the bottom leaf of the spring 22. Thus a swinging connection is provided, by means of the bolt-like member 39, between the leaf spring 22 and the outer end of the auxiliary spring 29' near the outer ends of the leaf spring 22. This is similar to the swinging connection between the hook-like members 30 and the eyes 31 in the form of the invention previously described.

In Figs. 9 and 10 a modified form of securing means for connecting the inner ends of the auxiliary springs and the vehicle leaf spring is shown. The frame member 21, of which only a fragment is shown in Fig. 9, is the same as previously described, and the spring 22 is mounted in a similar manner therein, the U-bolts 23 being provided for this purpose. Bracket members 41 are provided, that have vertically extending portions 42, which are provided with slots 43, through which the springs 29 extend, said springs being made in the same manner as previously described and being secured together by means of adjustable connecting means passing through the openings in the ears 35, such as the bolt 36 with which the nut 37 engages. Said bracket members 41 have transversely extending portions 44, which terminate in downturned end portions 45 forming lips or flanges on the bracket members 42. Said transversely extending portions 44 are mounted in grooves 47 provided in the bar-like members 46, which correspond to the bar-like members 27, previously described, these frequently being provided with such grooves 47 for receiving a leaf of the leaf spring 22. The transverse portion 44 of each bracket member 41 is thus clamped by a bar-like member 46, so as to be held in position between the lowermost leaf of the leaf spring 22, and a bar-like member 46, the nuts 28 cooperating with the U-bolt to so clamp said bracket. The brackets thus secure the adjacent ends of the spring members 29 to the vehicle leaf spring 22 in spaced relation thereto, and said adjacent ends are secured adjustably to each other by the bolt-like member 36 and nut 37 in the manner previously described.

While the various forms of the invention described above are particularly adapted for application to transverse leaf springs on vehicles that carry the wheels at the outer ends thereof and are secured to a transverse frame member at the center thereof, my invention is also adapted to be applied to longitudinally extending leaf springs of vehicles, such as the spring 22' shown in Fig. 7, which is shown as being connected with a longitudinal frame member 20' at one end thereof by means of a shackle member 48 and which is shown as being secured at the other end thereof to a bracket member 49 on the frame member 20'. A wheel hub is indicated conventionally at 50 and an axle at 51, the particular type of wheel and axle being of no particular importance in connection with the invention, and any suitable means for securing the spring 22' to the axle, such as U-bolt members 52, may be provided, a plate-like member 53 being provided for clamping said spring 22' to the axle by means of U-bolt members 52.

In adapting my invention to this type of vehicle spring, I provide a spring member 54 and a spring member 55, the spring member 54 being provided with a hook-like end 56 thereon, corresponding to the hook end 30 on the spring member 29 and cooperating with the eye on the end of the spring 22', in a similar manner to that previously described. The spring 54 also has a curved portion 57 corresponding to the curved portion 34 of the spring member 29, providing a convexly curved surface thereon facing and engaging the uppermost leaf of the spring 22'. Said spring 54 is also provided with an ear 58 thereon, that is perforated, similarly to one of the ears 35, and which is adapted to receive therethrough the bolt-like member 59.

The spring 55 is provided with stirrup-like means 38', similar to the stirrup-like members 38 previously described, for securing one end thereof to the end of the leaf spring 22' adjacent the bracket 49, and is provided with a curved portion 60, similar to the curved portion 57, and engaging the leaf spring 22' in a similar manner, the portions 57 and 60 engaging the spring 22' at the weakest points, or points of greatest flexure thereof, as in the forms of the invention previously described. Said spring 55 is provided further with an upwardly bowed portion 61 extending around the axle 51 and U-bolts 52, so as to be free thereof, and terminating in an ear 62, similar to the ear 58 through which the bolt-like member 59 extends, a nut 63 being provided on the bolt-like member 59, whereby the tension of the springs 54 and 55 can be adjusted so that the pressure exerted by the curved portions 57 and 60 having the convex faces engaging the upper leaf of the spring 22' can be adjusted to provide the proper arch for the springs 22' to give the proper position for the axle relative to the vehicle frame and to supplement the spring action of the springs 22', particularly after the same have been weakened due to overload, or due to length of use thereof.

Preferably, means is provided for securing the springs 54 and 55 in aligned position relative to the spring 22', comprising a U-bolt member 64 engaging the hook-like portion of the spring 55 formed by the curved portion 65 connecting the upwardly bowed portion 61 and the ear 62, a transverse bar-like member 66 being provided extending under the spring 22', through which extends the U-bolt 64 for clamping the bar-like member 66 in position against the under side of the spring 22', to thus secure the spring 55 to the spring 22', and thereby also the spring 54 to the spring 22'.

In certain types of heavy leaf springs, such as the leaf springs 122 shown in Fig. 8, usually provided on trucks, it is found to be desirable to provide a pair of curved spring members 68, which are provided with eyes 69 in the ends thereof, the convexly curved faces thereof engaging the spring 122 at the point of greatest flexure, or weakest point of said spring 122, and U-bolts 70, or similar fastening elements, being provided for securing the ends of the springs 68 to the spring 122, but in spaced relation thereto, bar-like members 71 and nuts 72 engaging the U-bolts being provided for adjustably clamping the springs 68 to the spring 122, the tension of the springs 68 and the pressure exerted by the convexly curved faces thereof on the leaf spring 122 being thus adjustable by adjusting the nuts 72 on the U-bolts 70. This arrangement of springs is found to be desirable where difficulty would be experienced in passing a spring of the type shown in Fig. 7 over an axle, such as the axle 151 provided on a vehicle having a frame member 120, in which the spring 122 is secured in any desired manner at the opposite ends thereof to said frame member, such as by means of the bracket 149 and the shackle member 148, the showing of these parts being merely conventional, as the particular mounting of the spring 122 on the frame is not part of my invention, but my invention is merely modified to be adapted for use on vehicles in which it is impossible to use such a spring arrangement as in Fig. 7, or the other forms of the invention above described.

In all forms of the invention the auxiliary springs are secured so that the same can have a swinging movement relative to the vehicle leaf spring with which the same are used at the ends thereof, and are capable of adjustment to vary the tension of said springs and the pressure exerted by said auxiliary springs tending to restore the arch of weakened springs and the proper position of the vehicle frame relative to the axle, or axles, that the vehicle spring connects, or connect, with the frame.

What I claim is:

1. The combination with a leaf spring having a plurality of arched leaves, of a pair of auxiliary springs curved to provide convex portions engaging said leaf spring at points spaced from the ends thereof, said auxiliary springs being mounted lengthwise of said leaf spring with their adjacent ends longitudinally spaced from each other, means for securing the remote end of each of said auxiliary springs to said leaf springs, and rigid adjustable means for securing the adjacent ends of said auxiliary springs to each other, comprising means for longitudinally tensioning said auxiliary springs.

2. The combination with a leaf spring having a plurality of arched leaves, of a pair of auxiliary springs curved to provide convex portions engaging said leaf spring at points spaced from the ends thereof, said auxiliary springs being mounted lengthwise of said leaf spring with their adjacent ends longitudinally spaced from each other, means for securing the remote end of each of said auxiliary springs to said leaf spring, said auxiliary springs being spaced from said leaf spring between their points of engagement therewith and the remote ends thereof, and rigid means for securing the adjacent ends of said auxiliary springs to each other, said rigid means being adjustable to determine the spacing of the adjacent ends of said auxiliary springs longitudinally thereof, to adjust the longitudinal tension of said auxiliary springs and the arch of said leaf spring.

3. The combination with a leaf spring having a plurality of arched leaves, of a pair of auxiliary springs curved to provide convex portions engaging said leaf spring at points spaced from the ends thereof, means for securing one end of each of said auxiliary springs to said leaf spring at an end portion of said leaf spring, means for adjustably securing the other ends of said auxiliary springs to each other to put the same adjustably under tension lengthwise thereof and means for securing said auxiliary springs to said leaf spring near said other ends, said auxiliary springs being spaced from said leaf spring between said points of engagement with said leaf spring and points of securement thereto.

4. The combination with a leaf spring having a plurality of arched leaves, of a pair of auxiliary springs curved to provide convex portions engaging said leaf spring at points spaced from the ends thereof, means for securing one end of each of said auxiliary springs to said leaf spring at an end portion of said leaf spring, rigid connecting means adjustable in length for adjustably securing the other ends of said auxiliary springs to each other and means for securing said auxiliary springs to said leaf spring near said other ends in spaced relation thereto.

5. The combination with a leaf spring having a plurality of arched leaves of graduated length and having end loops providing attaching eyes, of a pair of auxiliary springs having hook-like ends engaging around said loops to secure one end of each of said auxiliary springs to an end of said leaf spring, said auxiliary springs having ears at the opposite ends thereof to said hook-like ends and being curved to provide convex portions between the ends thereof engaging said leaf spring at approximately the points of greatest flexure thereof, and a headed screw-threaded element extending through said ears to adjustably secure said auxiliary springs to each other at the adjacent ends thereof.

6. The combination with a leaf spring having a plurality of arched leaves of graduated length and having end loops providing attaching eyes, of a pair of auxiliary springs having hook-like ends engaging around said loops to secure one end of each of said auxiliary springs to an end of said leaf spring, said auxiliary springs having ears at the opposite ends thereof to said hook-like ends and being curved to provide convex portions between the ends thereof engaging said leaf spring at approximately the points of greatest flexure thereof, a headed screw-threaded element extending through said ears to adjustably secure said auxiliary springs to each other at the adjacent ends thereof, and means for securing said auxiliary springs to said leaf spring near the adjacent ends of said auxiliary springs.

7. The combination with a leaf spring having a plurality of arched leaves of graduated length and having end loops providing attaching eyes, of a pair of auxiliary springs having stirrups thereon engaging said leaf spring adjacent said eyes to secure one end of each of said auxiliary springs to said leaf spring, said auxiliary springs having ears at the opposite ends thereof to said stirrups and being curved to provide convex portions between the ends thereof engaging said leaf spring at approximately the points of greatest flexure thereof, and a headed screw-threaded element extending through said ears to adjustably secure said auxiliary springs to each other at the adjacent ends thereof.

8. The combination with a leaf spring having a plurality of arched leaves of graduated length and having end loops providing attaching eyes, of a pair of auxiliary springs having stirrups thereon engaging said leaf spring adjacent said eyes to secure one end of each of said auxiliary springs to said leaf spring, said auxiliary springs having ears at the opposite ends thereof to said stirrups and being curved to provide convex portions between the ends thereof engaging said leaf spring at approximately the points of greatest flexure thereof, a headed screw-threaded element extending through said ears to adjustably secure said auxiliary springs to each other at the adjacent ends thereof, and means for securing said auxiliary springs to said leaf spring near the adjacent ends of said auxiliary springs.

9. The combination with a leaf spring having a plurality of arched leaves, of a pair of auxiliary springs curved to provide convex portions engaging said leaf spring at points spaced from the ends thereof, said auxiliary springs being mounted lengthwise of said leaf spring with their adjacent ends longitudinally spaced from each other, means for securing the remote end of each of said auxiliary springs to said leaf spring, and means for securing the adjacent ends of said auxiliary springs to each other, comprising ears at the adjacent ends thereof and a headed screw-threaded element extending through said ears longitudinally of said auxiliary springs to adjustably secure said auxiliary springs to each other.

10. The combination with a leaf spring having a plurality of arched leaves, of a pair of auxiliary springs curved to provide convex portions engaging said leaf spring at points spaced from the ends thereof, said auxiliary springs being mounted lengthwise of said leaf spring with their adjacent ends longitudinally spaced from each other, means for securing the remote end of each of said auxiliary springs to said leaf spring, means for securing the adjacent ends of said auxiliary springs to each other, comprising ears at the adjacent ends thereof and a headed screw-threaded element extending through said ears longitudinally of said auxiliary springs to adjustably secure said auxiliary springs to each other, and means for securing said auxiliary springs to said leaf spring near the adjacent ends of said auxiliary springs.

11. The combination with a leaf spring having a plurality of arched leaves, of a pair of auxiliary springs curved to provide convex portions engaging said leaf spring at points spaced from the ends thereof, said auxiliary springs being mounted lengthwise of said leaf spring with their adjacent ends longitudinally spaced from each other, means for securing the remote end of each of said auxiliary springs to said leaf spring, means for securing the adjacent ends of said auxiliary springs to each other, comprising ears at the adjacent ends thereof and a headed screw-threaded element extending through said ears longitudinally of said auxiliary springs to adjustably secure said auxiliary springs to each other, and means for securing said auxiliary springs to said leaf spring near the adjacent ends of said auxiliary springs, said auxiliary springs being slidably connected with said last mentioned securing means.

12. The combination with a leaf spring having a plurality of arched leaves, of a pair of auxiliary springs curved to provide convex portions engaging said leaf springs at points spaced from the ends thereof, said auxiliary springs being mounted lengthwise of said leaf spring with their adjacent ends longitudinally spaced from each other, means for securing the remote end of each of said auxiliary springs to said leaf spring, means for securing the adjacent ends of said auxiliary springs to each other, comprising ears at the adjacent ends thereof and a headed screw-threaded element extending through said ears longitudinally of said auxiliary springs to adjustably secure said auxiliary springs to each other, and means for securing said auxiliary springs to said leaf spring near the adjacent ends of said auxiliary springs, comprising bracket members secured to said leaf spring and slidably receiving said auxiliary springs.

13. The combination with a normally curved leaf spring having a plurality of arched leaves, of a pair of auxiliary springs curved to provide convex portions engaging said leaf spring on the concave side thereof at points spaced substantially equidistantly from the ends of said leaf spring, means for securing one end of each of said auxiliary springs to said leaf spring, means for securing the other ends of said auxiliary springs to each other and means slidably connected with said auxiliary springs for securing said auxiliary springs to said leaf spring near said other ends.

14. The combination with a leaf spring having a plurality of arched leaves, of a pair of auxiliary springs curved to provide convex portions engaging said leaf spring at points spaced from the ends thereof, means for securing one end of each of said auxiliary springs to said leaf spring at the end portions of said leaf spring, means for adjustably securing the other ends of said auxiliary springs to each other and means slidably connected with said auxiliary springs for securing said auxiliary springs to said leaf spring near the other ends of said auxiliary springs in spaced relation to said leaf spring.

RUDOLPH H. HELLWIG.